Jan. 1, 1952   E. C. HORTON   2,581,103
WINDSHIELD CLEANER
Filed June 19, 1945

INVENTOR
ERWIN C. HORTON
BY
Bean, Brooks, Buckley & Bean. ATTORNEYS

Patented Jan. 1, 1952

2,581,103

UNITED STATES PATENT OFFICE 2,581,103

WINDSHIELD CLEANER

Erwin C. Horton, Hamburg, N. Y., assignor to Trico Products Corporation, Buffalo, N. Y.

Application June 19, 1945, Serial No. 600,311

4 Claims. (Cl. 15—245)

This invention relates in general to windshield cleaners and particularly to the mounting of the wiper blade thereof.

As is well known to those skilled in the art, a windshield wiper blade consists of a channel-shaped holder, having one or more strips of rubber or other resilient material disposed within said holder, and an attaching fin or clip for connecting said blade to a supporting arm. The fin which is usually of thin metal, engages the holder by being passed through an elongated opening formed therein.

The principal object of the invention has been to provide a fin which may be rigidly attached to the holder in a practical and durable manner and without the use of screws or other separate fastening means.

The above objects and advantages have been accomplished by the device shown in the accompanying drawings which illustrate a typical embodiment of the invention.

Figure 1:
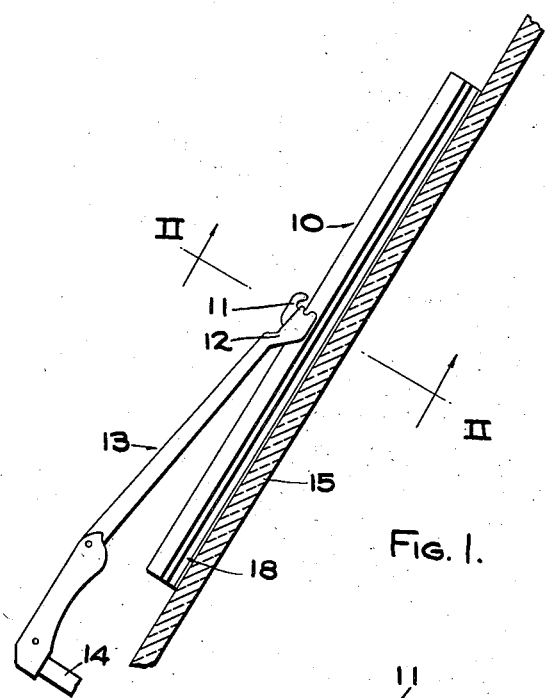
Fig. 1 is a fragmentary sectional view of the windshield of a motor vehicle, showing the invention in an operative relation thereto.
Figure 3:
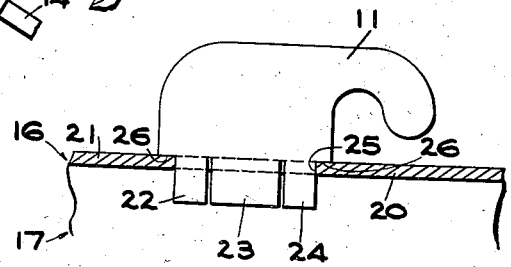
Fig. 3 is an enlarged fragmentary side elevation of a portion of the wiper blade with the attaching tab or fin in position before the same is secured in place.

As shown in Fig. 1, the wiper blade 10 is provided with an attaching fin 11 by which it is connected to the slotted end 12 of the wiper arm 13. This arm is carried by a shaft 14 by which the wiper blade is oscillated back and forth across the windshield 15 in a well known manner. The wiper blade is provided with a channel-shaped holder 16 formed with two depending flanges 17 joined by curved wall portions 20 to a web 21. A wiper element 18 of any suitable resilient material is clamped between the flanges 17 of the holder.

Figure 2:
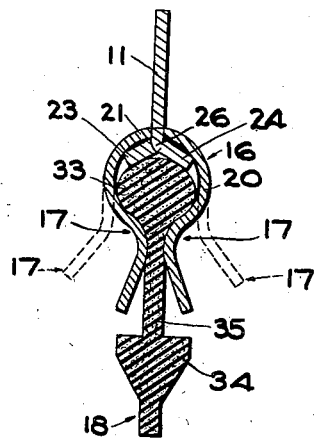
Fig. 2 is an enlarged cross-sectional view of the wiper blade as taken about on line II—II of Fig. 1.
Figure 4:
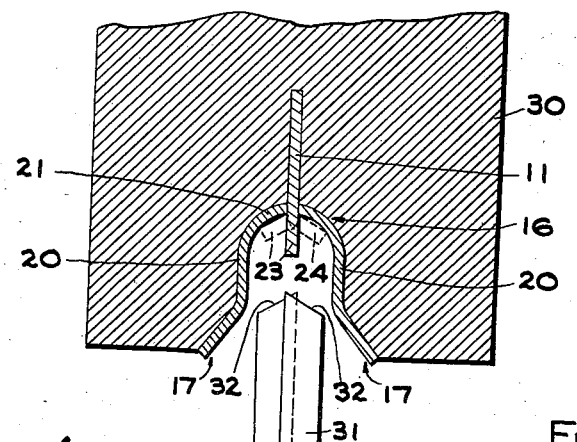
Fig. 4 is an enlarged transverse sectional view of the partly formed holder showing the same supported by means of a die member and ready to be acted upon by a punch to secure the attaching tab to the holder.

The attaching fin 11 is provided with an anchoring portion adapted to be swaged or clenched over the inner face of the holder. This anchoring portion is shown as having a plurality of downwardly extending tongues 22, 23, and 24 which are passed through an elongated opening 25 formed in the back or web 21 of the holder. The tongues are spaced inwardly from the longitudinal edges of the fin whereby a shoulder 26 is formed at each end of the fin for seating on the back of the holder and thereby limit its inward movement through the opening 25. In securing the fin in place, the anchoring tongues 22, 23, and 24 may be clenched against the underface of the web 21 in any suitable manner after they have been passed through the opening 25. As shown in Fig. 2, tongues 22 and 24 are shown bent in the same direction, whereas the intermediate tongue 23 is bent in the opposite direction. The tongues thus overlie the side edges of the opening 25 and together with the shoulders 26 clampingly embrace the channeled holder to secure the fin in position. This tongue bending step may be accomplished by supporting the holder 16 and fin 11 within a die member 30 shaped, as shown in Fig. 4, to fit these parts when initially assembled. With the parts thus supported, a cooperating punch 31 is brought into action to clench the tongues. For this purpose the punch is provided with alternately arranged inclined surfaces 32 for displacing the tongues in opposite directions as shown by the dotted lines in Fig. 4. In thus deforming the tongues, the channeled holder is pressed firmly against the shoulders 26 and secured by the underlying tongues.

It is to be noted that because of the initial formation of the holder 16 with the spread or open flanges 17, free access may be had to the tongues for deforming them. After this clenching operation, the holder is removed from the die member and the wiping element 18 is placed between the flanges 17. This rubber insert or wiping element may be made of a plurality of strips of rubber held together by the pressure of the co-acting flanges or, as shown, it may be molded with a circular anchoring bead 33 and a triangular wiping edge 34, joined together by a web portion 35.

In the final step of assembling, the anchoring bead is placed within the channel of the holder and against the clenched tongues, whereupon the flanges 17 are then bent toward each other by any suitable means to firmly embrace the rubber insert. In thus bending the flanges 17 inwardly the side wall portions 20 will be brought firmly against the anchoring tongues to place the latter under stress and thereby cause the side wall portions to exert an inward pull on the fin. This causes the shoulders 26 to seat under pressure on the crowned web 21 and gives support to the fin against lateral play.

While but one embodiment of the invention is shown and described herein, it is obvious that some detailed modifications may be made without departing from the spirit of the invention or the scope of the appended claims, the form shown being merely a preferred embodiment thereof.

What is claimed is:

1. A wiper blade comprising a channeled holder having a crowned back wall with an opening therein, an attaching element seating on the exterior crowned surface of the holder and having an anchoring portion extending through the opening into the holder channel, the anchoring portion having lateral retaining parts within the channel overhanging the margin of the opening with the laterally inclined side portions of the crowned back wall acting to stress the retaining parts inwardly to urge the attaching element firmly to its seat on the exterior surface of the crowned wall, and a wiping element embraced by the sides of the holder.

2. A wiper blade comprising a channel holder having outwardly extending flanges joined longitudinally by a web, a wiper element disposed between said flanges, and an attaching member seating on said holder and having a plurality of anchoring tongues extending through an opening in the web and deflected in opposite directions within the channel against the underside of the web, the adjacent lateral portions of the web acting inwardly under tension on the tongue to hold the attaching member upright on its seat.

3. A wiper blade comprising a channeled holder having outwardly extending flanges integrally joined longitudinally by a web, a wiper element disposed between said flanges, and an attaching element affixed to said holder, said element fitting through a slot in the web and having a shoulder at each end seating upon the exterior surface of said web and a plurality of alternately arranged anchoring tongues intermediate the shoulders and extending downwardly through the slot and laterally thereof, said tongues bearing against the underside of the adjacent web portion under lateral compression for holding the element upright and rigid on the back of the blade.

4. A wiper blade comprising a channeled holder having spaced flanges joined longitudinally by a web, a wiper element disposed between said flanges, and an attaching element seating on the exterior face of the back of said holder and having preshaped anchoring means extending through an opening formed therein, said anchoring means having lateral portions underlying the back and said holder having inherent means exerting an inward pull upon said lateral portions to hold the element firmly secured upon the back of the holder.

ERWIN C. HORTON.

REFERENCES CITED

The following references are of record in the file of this patent:

UNITED STATES PATENTS

| Number | Name | Date |
| --- | --- | --- |
| 635,462 | Bourke | Oct. 24, 1899 |
| 1,924,386 | Wallenbeck | Aug. 29, 1933 |
| 1,946,073 | Horton | Feb. 6, 1934 |
| 2,105,021 | Walton | Jan. 11, 1938 |
| 2,232,355 | Abelnour | Feb. 18, 1941 |
| 2,310,177 | Horton | Feb. 2, 1943 |